(No Model.)
A. L. JORDAN.
CHECK ROWER.
No. 293,888.  Patented Feb. 19, 1884.
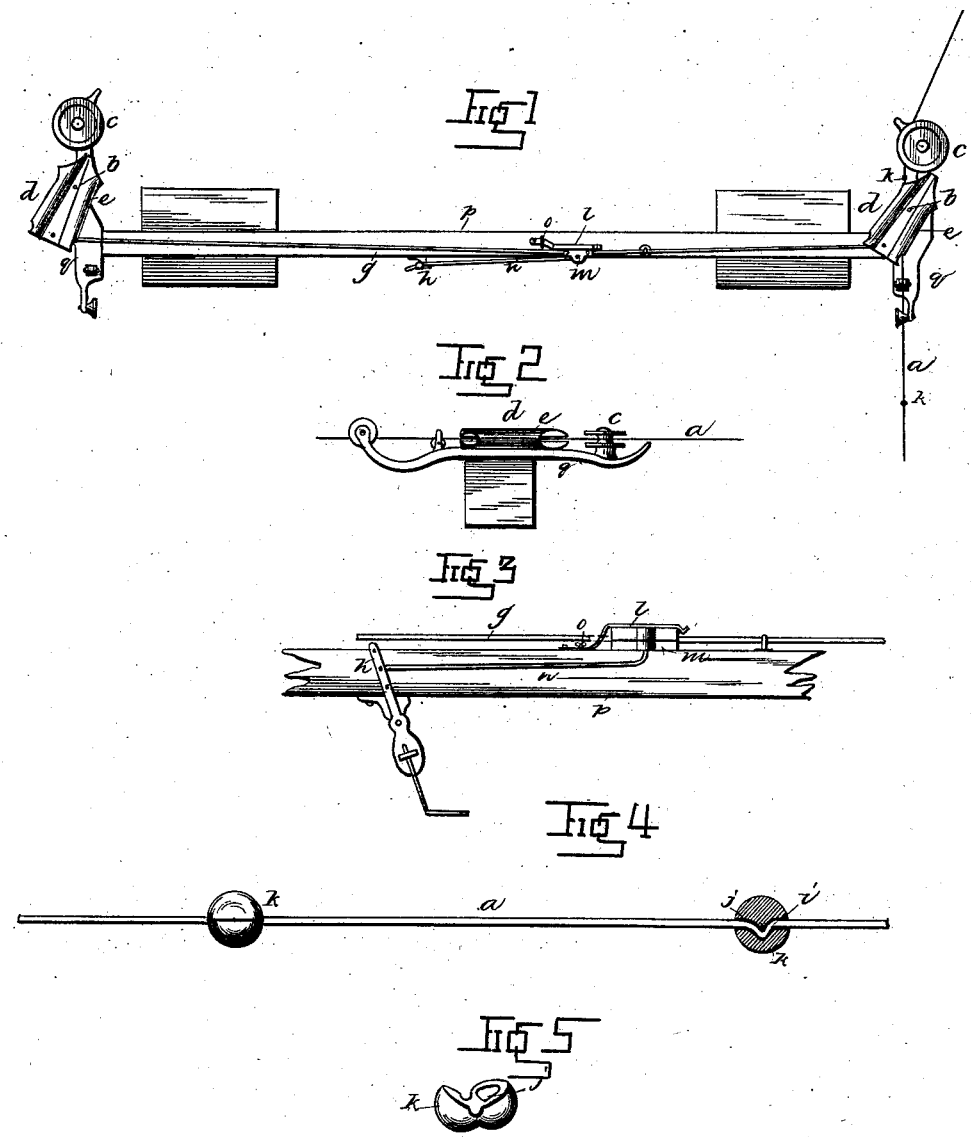

UNITED STATES PATENT OFFICE.

AMBROSE L. JORDAN, OF OTTAWA, ILLINOIS, ASSIGNOR OF ONE-HALF TO RICHARD C. JORDAN, OF SAME PLACE.

CHECK-ROWER.

SPECIFICATION forming part of Letters Patent No. 293,888, dated February 19, 1884.

Application filed November 21, 1883. (No model.)

*To all whom it may concern:*

Be it known that I, AMBROSE L. JORDAN, a citizen of the United States, residing at Ottawa, in the county of La Salle and State of Illinois, have invented certain new and useful Improvements in Check-Rowers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a plan view of my improved check-rower. Fig. 2 is an end view. Fig. 3 is a bottom view. Figs. 4 and 5 are detail views.

This invention has relation to check-rowers; and it consists in the construction and novel arrangement of devices, as will be hereinafter fully described, and particularly pointed out in the claims appended.

The check-rower is operated by a wire or rope, *a*, stretched across the field and secured at each end. This wire or rope *a* is provided with knots or obstructions *k* at proper distances apart, and is held in position on the side of the planter by guides, rollers, or sheaves *c*, so located as to cause said wire to pass over or under a triangular-shaped piece, *d*, pivoted centrally, and having on its outer edges tubes or flanges *e*, diverging from the front and opening along their entire inner sides, to allow free passage for said wire or rope *a*, but sufficiently closed to effectually resist said knots or obstructions, except in the direction of these tubes or flanges, which receive the obstructions upon wire in front and discharge them in rear. In passing one of said knots or obstructions the triangular-shaped piece *d* gives way to the pressure on the tube or flange turning upon its pivot *b*, whereby its rear end is shifted to one side sufficiently to allow said knot or obstruction to escape through the rear guides, by which movement the front of said triangular piece is placed in position to bring its opposite tube or flange into contact with the next knot or obstruction on the wire. Thus the triangular plate is shifted by each knot or obstruction, its tubes or flanges coming consecutively in contact with them. There is one of said triangular plates *d* at each end of the check-rower at each side of the planter. The triangular plates *d* are made of one piece, and are connected by a single pitman-rod, *g*, which traverses the planter, and is pivoted at its ends to the rear portions of the triangular pieces *d*.

Near the middle of the rod *g* is attached one end of a centrally-pivoted perpendicular lever, *h*, the lower end of which is attached to the shake-bar of the planter; hence, when one of the triangular pieces comes in contact with a knot or obstruction, *k*, on the check-rower wire, the shake-bar to the planter is caused to make a stroke and the seed is dropped. At the points where the obstructions are located there are V-shaped bends or indentations *i* in the check-rower wire embedded in grooves *j*, of corresponding shape, in the middle of the obstructions *k*. These obstructions are of metal and are firmly clasped over the wire, and when finished are globular in form, as shown. This check-rower may, however, be operated by any wire or rope in use for operating other check-rowers, the one described being preferable.

To prevent a rebound of the shake-bar, a flat friction-spring, *l*, is so placed as to bear upon the clamp *m*, which is attached to pitman *n* near the middle of the cross-rod. The spring *l* is made adjustable, to cause more or less friction, as may be required, by turning the nut *o* on the bolt which holds it to the check-rower wooden bar *p*. This bar *p* crosses the planter, and upon the ends of it rest the plates or cross-pieces *q*, which support the guides, pulleys, and triangular-shaped pieces aforesaid.

This check-rower is one of the simplest made. It is quick and positive in its operation. The balls or obstructions on the wire are not liable to catch or clog the check-rower, and it is not liable to get out of adjustment.

Having thus fully described my invention, what I claim as new, and desire to secure by Letters Patent, is—

1. In a check-rower, the triangular-shaped piece centrally pivoted, having upon its two outer edges or sides, which diverge from the front, tubes or tubular flanges, which along their entire inner sides are open to allow free passage of the check-rower wire, but sufficiently closed to prevent the escape of the knots or obstructions, except through the tubes, (lengthwise of said tubes,) which receive them in front and discharge them in the rear through openings for that purpose, substantially as specified.

2. In a check-rower, the centrally-pivoted triangular piece, in combination with the cross-rod or long pitman, the clamp holding the short pitman and attaching it to the cross-rod, the friction-spring, the centrally-pivoted perpendicular lever, and the attaching device by which it is connected to the shake-bar, substantially as specified.

In testimony whereof I affix my signature in presence of two witnesses.

AMBROSE L. JORDAN.

Witnesses:
CHAS. A. RENZ,
E. JORDAN.